United States Patent
Ke

(10) Patent No.: US 12,313,180 B2
(45) Date of Patent: May 27, 2025

(54) GAS FLOW VALVE AND METHODS OF OPERATING THEREOF

(71) Applicant: Applied Materials, Inc., Santa Clara, CA (US)

(72) Inventor: Chang Ke, Sunnyvale, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 18/235,459

(22) Filed: Aug. 18, 2023

(65) Prior Publication Data

US 2025/0060048 A1    Feb. 20, 2025

(51) Int. Cl.
F16K 37/00    (2006.01)
B04C 3/06    (2006.01)
F16K 31/06    (2006.01)

(52) U.S. Cl.
CPC ............ F16K 31/0655 (2013.01); B04C 3/06 (2013.01); F16K 37/0041 (2013.01)

(58) Field of Classification Search
CPC .......................... F16K 37/0083; F16K 37/0041
See application file for complete search history.

(56) References Cited

U.S. PATENT DOCUMENTS

| | | | | |
|---|---|---|---|---|
| 5,616,829 A | * | 4/1997 | Balaschak | G01M 3/184 251/20 |
| 5,741,002 A | * | 4/1998 | Breyer | F16K 37/0041 251/30.04 |
| 7,869,971 B2 | * | 1/2011 | Varga | F16K 37/0091 702/33 |
| 9,354,640 B2 | * | 5/2016 | Byler | A61M 1/14 |
| 10,006,564 B2 | * | 6/2018 | Okamura | F16K 1/42 |
| 11,028,941 B2 | * | 6/2021 | Ferreira | F16K 31/0627 |
| 2017/0350535 A1 | * | 12/2017 | Jameson | G01R 23/16 |
| 2020/0393060 A1 | | 12/2020 | Tanno et al. | |
| 2022/0034416 A1 | * | 2/2022 | Roald | F16K 15/028 |

FOREIGN PATENT DOCUMENTS

| | | |
|---|---|---|
| JP | 2007048145 A | 2/2007 |
| JP | 2009115254 A | 5/2009 |
| JP | 2011124424 A | 6/2011 |
| KR | 20040072551 A | 8/2004 |

OTHER PUBLICATIONS

Machine translation JP 2011124424.*
International Search Report and Written Opinion for International Application No. PCT/US2024/010650, mailed May 16, 2024, 10 Pages.

* cited by examiner

*Primary Examiner* — Kevin F Murphy
(74) *Attorney, Agent, or Firm* — Lowenstein Sandler LLP

(57) ABSTRACT

Certain embodiments of the present disclosure relate to a gas flow valve. The gas flow valve includes a housing configured to receive a flow of gas. The gas flow valve further includes a plunger configured to move between a closed position and one or more open positions within the housing. The gas flow valve further includes a position sensor configured to measure a distance associated with a difference in position of the plunger between the closed position and the one or more open position. The gas flow valve further includes a force sensor coupled to the plunger and configured to measure a force exerted by the plunger in the closed position on a sealing surface.

20 Claims, 8 Drawing Sheets

GAS FLOW VALVE AND METHODS OF
OPERATING THEREOF

TECHNICAL FIELD

Embodiments of the present disclosure relate, in general, to a valve for controlling a flow of gas.

BACKGROUND

Various manufacturing systems (e.g., for semiconductor applications) may include gas flow valves to control the amount of gas flowed e.g., to a process chamber. Gas flow valves may actuate based on controller inputs. Controllers may use sensor data, such as flow sensor data, to cause gas flow valves to actuate to meet target flow rates. In some manufacturing systems, process gases (e.g., gases used during semiconductor fabrication processes) and/or cleaning gases (e.g., gases used to clean a manufactured device and/or a chamber used in manufacturing an electronic device) may have precise delivery targets including high mass flow rates as well as the ability to precisely control low flow rates. Additionally, gas flow valves are subject to wear and leakage which may be caused by particles carried in the gas flow. These particles can damage the valve and other downstream components.

SUMMARY

Certain embodiments of the present disclosure relate to a gas flow valve including a housing configured to receive a flow of gas. The gas flow valve further includes a plunger configured to move between a closed position and one or more open positions within the housing. The gas flow valve further includes a position sensor configured to measure a distance associated with a difference in position of the plunger between the closed position and the one or more open positions. The gas flow valve further includes a force sensor coupled to the plunger and configured to measure a force exerted by the plunger in the closed position on a sealing surface.

In another aspect of the disclosure, a gas flow assembly includes a valve including a housing configured to receive a flow of gas. The valve further includes a plunger configured to move between a closed position and one or more open positions within the housing. The valve further includes a position sensor configured to measure a distance associated with a difference in position of the plunger between the closed position and the one or more open positions. The valve further includes a force sensor coupled to the plunger and configured to measure a force exerted by the plunger in the closed position on a sealing surface. The gas flow assembly further includes a particle trap forming a chamber configured to separate particles from the flow of gas. The gas flow assembly further includes a processing device configured to cause the valve to actuate to control the flow of gas based on sensor data from one or more of the position sensor or the force sensor.

In another aspect of the disclosure, a method includes receiving position data from a position sensor configured to measure a distance associated with a difference in position of a gas valve plunger configured to move between a closed position and one or more open positions. The method further includes receiving force data from a force sensor coupled to the plunger and configured to measure a force exerted by the plunger in the closed position on a sealing surface. The method further includes causing the plunger to actuate between the closed position and the one or more open positions based on one or more of the position data or the force data.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
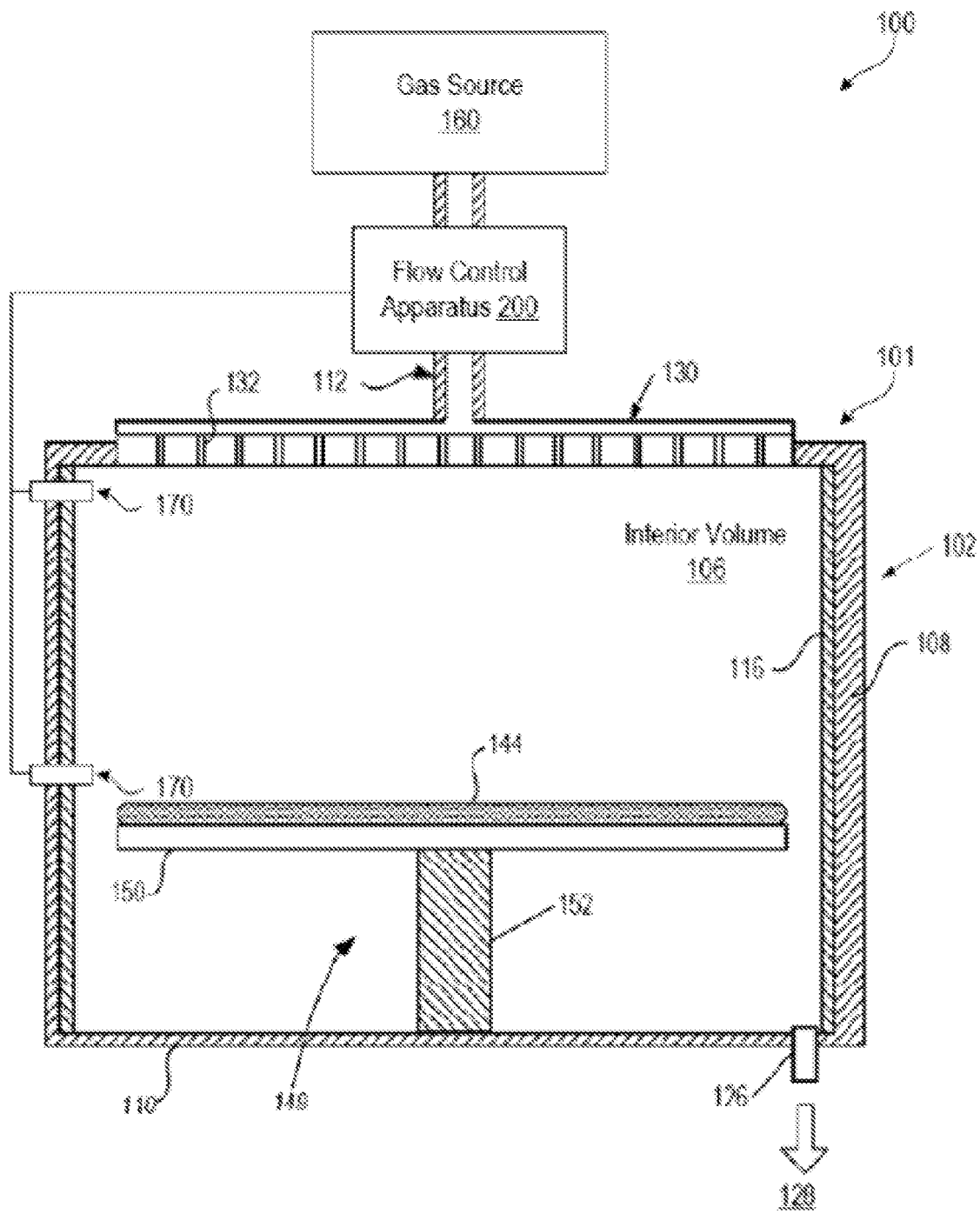
FIG. 1 illustrates an exemplary system that includes a processing chamber, a gas source, and a flow control apparatus, in accordance with embodiments of the present disclosure.

Embodiments described herein relate to a gas flow valve (also referred to as a gas flow control valve, a proportional gas flow control valve, etc.), a gas flow system incorporating the same, and a method of controlling the gas flow valve. Generally, it is advantageous to proportionally control the flow of gas to a system such as a substrate manufacturing system. Conventional gas flow control valves are passive devices which actuate based on control inputs (e.g., from a controller). Control inputs are typically based on target gas flow rates and flow rate sensor data. However, conventional gas flow control valves can suffer from poor precision, repeatability, reliability, and cleanliness.

Often, gas flow control valves wear over time with continued use. For example, the sealing surfaces inside the valve can deteriorate and/or erode, leading to mechanical or electrical hysteresis in the valve. This hysteresis causes drift in valve performance which can cause incorrect or unexpected gas flow rates to be allowed through the valve responsive to actuation caused by the controller. Deterioration of the valve sealing surfaces can also lead to gas leakage that can worsen over time, further damaging the valve and erroneously introducing gas into a manufacturing process when the gas valve should be closed. Further, the deterioration of traditional gas flow control valves leads to particle generation. The generated particles are carried by the gas flow and can further damage the valve, cause reliability issues in the valve, or damage the downstream manufacturing process and/or associated components, and/or contaminate an in-process substrate. Because traditional gas flow control valves lack internal sensors that can detect valve wear and/or particles, the effects of wear and/or particles in the valve are not sufficiently compensated for in traditional control algorithms. Thus, traditional gas flow control valves may suffer from a lack of precision, especially as the health of internal components deteriorate or wears over time. Compensating for valve wear and deterioration of performance over time would be advantageous.

Aspects and implementations of the instant disclosure address the above-described and other shortcomings of conventional gas flow valves by providing a gas flow control valve having one or more sensors, and/or actuators. In some embodiments, a gas flow control valve includes a housing. The housing may have one or more internal passages to receive a flow of gas. The gas may be a process gas such as nitrogen, Argon, etc. The gas may be a corrosive gas, for example a gas used in substrate etching operations. In some embodiments, the flow control valve housing contains movable mechanical components such as a plunger assembly and one or more sensors to measure one or more metrics associated with the valve. In some embodiments, the housing includes one or more actuators remove particles from the valve by causing one or more valve components to vibrate to dislodge particles. In some embodiments, the housing includes a particle trap to trap particles. In some embodiments, the housing additionally contains one or more sealing surfaces to stop the flow of gas (e.g., when the valve is closed). In some embodiments, the one or more sealing surfaces include an elastomer seal that is contacted by the plunger assembly when the valve is closed (e.g., when the plunger assembly is in a closed position).

In some embodiments, the plunger assembly (e.g., a plunger) is configured to move between a closed position (e.g., when the valve is closed) and one or more open positions within the housing (e.g., when the valve is opened). While in a closed position, a bottom face of the plunger contacts a sealing surface of the gas flow valve to block the flow of gas through the housing. The plunger can be moved to one or more open positions to allow gas to flow. In some embodiments, an increased distance of the bottom face of the plunger from the sealing surface allows an increased gas flow rate through the valve. In some embodiments, the plunger is caused to move by an actuator, such as an electrical actuator or a pneumatic actuator. In some embodiments, an electromagnetic coil coupled to the housing is energized to move the plunger. In some embodiments, the electromagnetic coil induces an electromagnetic force on the plunger to overcome force of a spring that holds the plunger normally closed or normally open. In some embodiments, a controller causes the plunger to open and close to proportionally control the flow of gas through the valve.

In some embodiments, a position sensor is configured to measure the position of the plunger. In some embodiments, the position sensor measures the position of the plunger relative to the position sensor. For example, the position sensor may measure the distance between the position sensor and a surface of the plunger. In some embodiments, the position sensor is a capacitive displacement sensor located within the housing. The position sensor may be disposed within the housing above the plunger (e.g., opposite a sealing surface) and may measure the distance between the sensor and the top of the plunger. Sensor data from the position sensor may be sent to a controller. Because the distance between the top of the plunger and the bottom of the plunger (e.g., the length or height of the plunger) is known, the controller can determine the distance between the bottom face of the plunger and the sealing surface of the gas flow control valve. The controller can thus determine how far "open" the valve is based on the position sensor data.

In some embodiments, a force sensor is coupled to the bottom face of the plunger. In some embodiments, the force sensor can measure the force exerted by the plunger in the closed position on the sealing surface. In some embodiments, the force sensor is a piezoelectric module that outputs an electrical signal corresponding to the sensed force. In some embodiments, the force sensor is bonded to the bottom face of the plunger. The force sensor may contact the sealing surface of the valve when the plunger is in the closed position to stop the flow of gas. In some embodiments, the force sensor can be induced to vibrate by providing an electrical current to the sensor. For example, a piezoelectric module may vibrate when provided with electrical current. In some embodiments, vibration of the force sensor may cause particles on the sealing surface to become dislodged. The dislodged particles may be carried away by the flow of gas. In this case, the force sensor acts as an actuator, which actively cleans the particles from the valve by causing the valve components to vibrate.

In some embodiments, the health of the sealing surface can be determined (e.g., by the controller) based on the force sensor data and the position sensor data. In some embodiments, the controller can calculate a stress-strain curve of the sealing surface using the force data and the position data. The calculated stress-strain curve can be compared to a stress-strain curve of a sealing surface in good condition. In some embodiments, when the calculated stress-strain curve fails to meet a threshold criterion (e.g., the calculated stress-strain curve substantially differs from the known good stress-strain curve, etc.), the controller can determine that the sealing surface has deteriorated beyond a threshold condition. In some examples, the controller can determine that an elastomer sealing surface (e.g., an o-ring seal, etc.) has worn or deteriorated when the stress-strain curve calculated using the force data and the position data fails to meet a threshold condition.

In some embodiments, the controller can determine that the valve is leaking based on the force sensor data. In some examples, a leak between the sealing surface and the plunger will cause the force sensor to sense fluctuations in applied force. The controller may identify these fluctuations in force as a leak. In some embodiments, the controller may cause the plunger to be closed (e.g., actuated to the closed position) with more force to stop the leak.

In some embodiments, a particle trap is coupled to the outlet of the gas flow valve. The particle trap may have a chamber to induce a cyclonic flow within the chamber. In some embodiments, centrifugal force may cause the particles to move to the outer radius of the chamber and contact the chamber walls. The chamber walls may be rough so that the particles adhere to the chamber walls. In some embodiments, the particles are collected in a removable (e.g., detachable) receptacle which can be periodically removed to dispose of the collected particles. Substantially particle-free gas may flow through a collection tube in the chamber of the particle trap to exit the system.

Embodiments of the present disclosure provide advantages over conventional systems described above. Particularly, some embodiments described herein provide a gas flow control valve that can be actuated based on sensor data collected from integral sensors. For example, the plunger of a valve described herein can be actuated to open to a target position based on position data received from a position sensor. In another example, the plunger can be more tightly closed based on force data received from a force sensor. In some embodiments described herein, the gas flow control valve can monitor the health of the sealing surface using one or more of the position sensor or the force sensor by comparing a calculated stress-strain curve to a threshold criterion (e.g., known good values) which can be advantageous to avoid unscheduled downtime to replace valve components. In some embodiments described herein, the gas flow valve can detect a leak and perform appropriate operations to remedy the leak such as apply a greater force to close the valve. In some embodiments described herein, the gas flow valve includes a in-situ particle cleaning feature to dislodge particles, making the valve cleaner than conventional gas flow valves. In some embodiments, the gas flow valve includes a particle trap to collect particles in the gas flow, providing cleaner gas with fewer particles as compared to a conventional gas flow valve. In some embodiments, because of the advantages of the gas flow valve described herein, a manufacturing system can more accurately process substrates with fewer errors and less scrap, leading to an overall increase in system throughput. Gas flow control valves described in at least some embodiments herein can provide improved precision, improved repeatability, improved reliability, and/or improved cleanliness as compared to traditional gas flow control valves. For example, gas flow control valves described in some embodiments herein may avoid mechanical and/or electrical hysteresis, may reduce wearing of parts, and/or may reduce contamination accumulation, which may result in one or more of the aforementioned improvements over traditional flow control valves.

FIG. 1 depicts a system 100 that includes a processing chamber 101, a gas source 160, and a flow control apparatus (e.g., gas stick assembly 200) in accordance with embodiments of the present disclosure. The processing chamber 101 may be used for processes in which a corrosive plasma environment is provided. For example, the processing chamber 101 may be a chamber for a plasma etcher or plasma etch reactor, a plasma cleaner, and so forth. In alternative embodiments, other processing chambers may be used, which may or may not be exposed to a corrosive plasma environment. Some examples of chamber components include a chemical vapor deposition (CVD) chamber, a physical vapor deposition (PVD) chamber, an ALD chamber, an IAD chamber, an etch chamber, and other types of processing chambers. In some embodiments, processing chamber 101 may be any chamber used in an electronic device manufacturing system.

In one embodiment, the processing chamber 101 includes a chamber body 102 and a showerhead 130 that encloses an interior volume 106. The showerhead 130 may include a showerhead base and a showerhead gas distribution plate (GDP), which may have multiple gas delivery holes 132 (also referred to herein as channels) throughout the GDP. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel, or other suitable material such as titanium. The chamber body 102 generally includes sidewalls 108 and a bottom 110.

An outer liner 116 may be disposed adjacent the sidewalls 108 to protect the chamber body 102. The outer liner 116 may be fabricated to include one or more apertures. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 101.

The gas source 160 may be coupled to the processing chamber 101 to provide process and/or cleaning gases via supply line 112 to the interior volume 106 through a showerhead 130. The flow control apparatus may be coupled to the gas source 160 and processing chamber 101. The flow control apparatus may be used to measure and control the flow of gas from the gas source 160 to interior volume 106. An exemplary flow control apparatus is described in greater detail below with respect to FIGS. 2A-2B. In some embodiments, flow control apparatus includes a gas flow valve as described herein. In some embodiments, one or more gas panels 160 may be coupled to processing chamber 101 to provide gases to the interior volume 106. In such embodiments, one or more flow control systems may be coupled to each gas source 160 and processing chamber 101. In other embodiments, a single flow control apparatus may be coupled to one or more gas panels 160. In some embodiments, the flow control apparatus may comprise a flow ratio controller to control the flow of gases to the processing chamber 101 (e.g., through one or more supply lines 112), or to other processing chambers.

In some embodiments, a separate flow control apparatus is used for each gas supplied to the processing chamber. In embodiments, each flow control apparatus is or includes a gas stick assembly, as described and illustrated below with respect to FIGS. 2A-2B.

The showerhead 130 may be supported on the sidewall 108 of the chamber body 102. The showerhead 130 (or lid) may be opened to allow access to the interior volume 106 of the processing chamber 101, and may provide a seal for the processing chamber 101 while closed. The gas source 160 may be coupled to the processing chamber 101 to provide process and/or cleaning gases to the interior volume 106 through the showerhead 130 or lid and nozzle (e.g., through apertures of the showerhead or lid and nozzle).

In some embodiments, one or more sensor assemblies 170 may be disposed within the interior volume 106. For example, one or more sensor assemblies 170 may be located near (e.g., within 10 centimeters of) the showerhead 130. As another example, one or more sensor devices may be located near (e.g., within 10 centimeters of) the substrate 144, which may be used to monitor conditions near the reaction site.

In one embodiment, the substrate support assembly 148 includes a pedestal 152 that supports an electrostatic chuck 150. The electrostatic chuck 150 further includes a thermally conductive base and an electrostatic puck bonded to the thermally conductive base by a bond, which may be a silicone bond in one embodiment. The thermally conductive base and/or electrostatic puck of the electrostatic chuck 150 may include one or more optional embedded heating elements, embedded thermal isolators, and/or conduits to control a lateral temperature profile of the substrate support assembly 148. The electrostatic puck may further include multiple gas passages such as grooves, mesas, and other surface features that may be formed in an upper surface of the electrostatic puck. The gas passages may be fluidly coupled to a source of a heat transfer (or backside) gas such as helium via holes drilled in the electrostatic puck. In operation, the backside gas may be provided at controlled pressure into the gas passages to enhance the heat transfer between the electrostatic puck and a supported substrate 144. The electrostatic chuck 150 may include at least one clamping electrode controlled by a chucking power source.

Figure 2A:
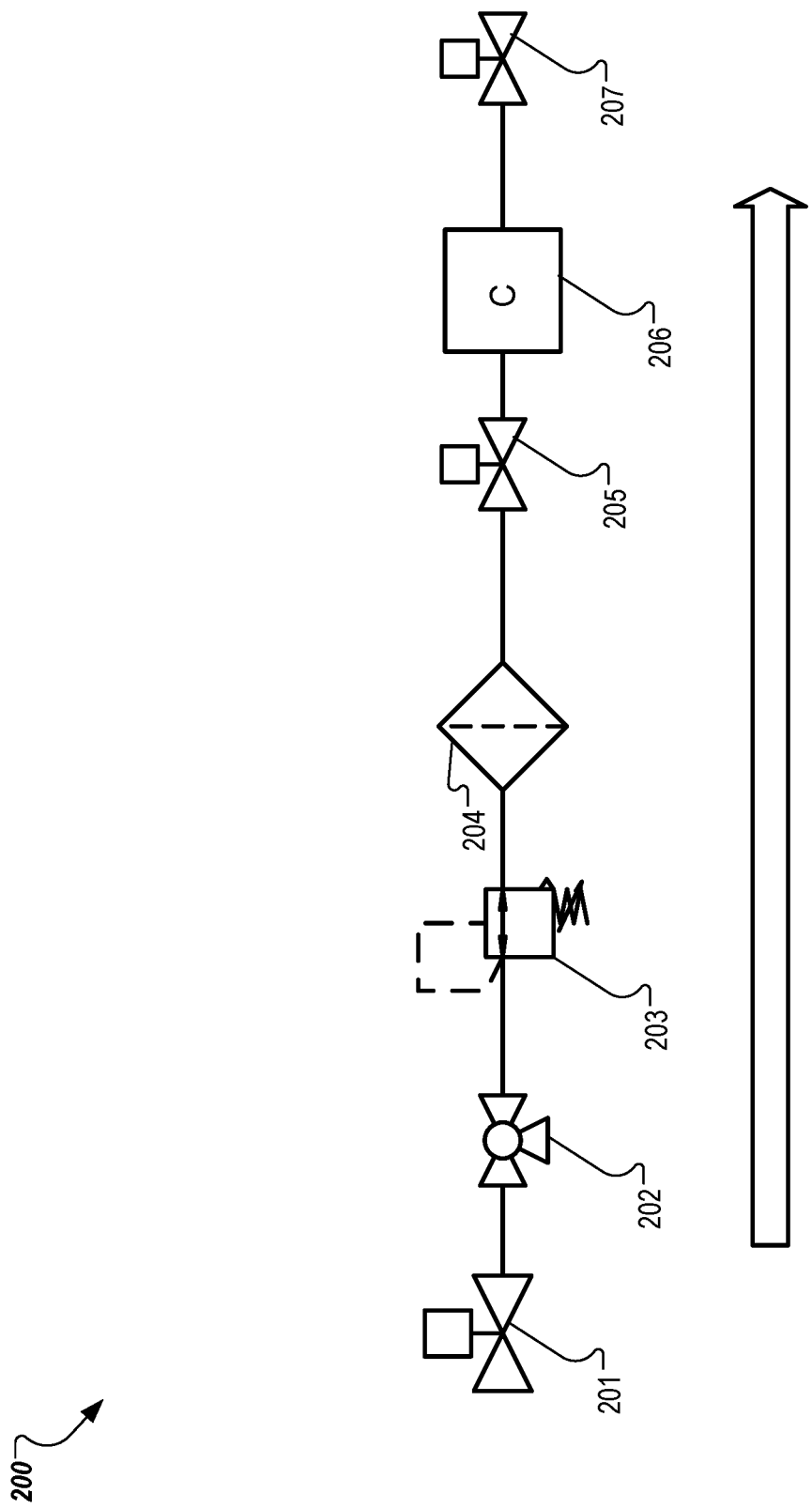
FIG. 2A is a schematic diagram of a gas stick assembly in accordance with embodiments of the present disclosure.

FIG. 2A illustrates a schematic diagram of a gas stick assembly in accordance with embodiments of the present disclosure. A plurality of gas stick assemblies may receive gasses from a plurality of gas supplies. For example, a processing device may include a different gas stick assembly for each type of gas that is delivered into a process chamber. As shown, gas flows from left to right through the gas stick assembly. In some embodiments, gas stick assembly 200 includes a hybrid valve 201, which may be a first component of the gas stick assembly 200. A hybrid valve may include a manual valve and a valve that can be automatically actuated (e.g., a pneumatic valve, electrical valve, etc.). Hybrid valve 201 may receive a gas from a gas source (not illustrated). The hybrid valve 201 may direct the gas to a purge valve 202 via one or more passages. The purge valve 202 may be configured to purge the gas stick assembly 200. In some embodiments, gas stick assembly 200 includes a regulator 203. The regulator 203 may receive the gas from the purge valve 202. The regulator 203 may regulate the flow of the gas through the gas stick assembly 200. In some embodiments, a filter 204 is coupled downstream of the regulator 203, and receives the flow of gas from the regulator 203. In some embodiments, an upstream valve 205 may receive the gas from the regulator 203 and direct the gas flow to a mass flow controller 206. The mass flow controller 206 may control the flow of gas through the gas stick assembly 200. In some embodiments, a downstream valve 207 receives the gas from the mass flow controller or other upstream component. The downstream valve 207 may direct the gas toward a gas destination (e.g., a processing chamber; not illustrated). In some embodiments, one or more of the hybrid valve 201, upstream valve 205, or downstream valve 207 include one or more integral sensors such as a force sensor and/or a position sensor as described herein. In some embodiments, one or more of the hybrid valve 201, upstream valve 205, or downstream valve 207 are actuated based on force sensor data and/or position sensor data as described herein. In some embodiments, one or more of the hybrid valve 201, upstream valve 205, or downstream valve 207 include a particle trap configured to trap particles in the gas flow.

Figure 2B:
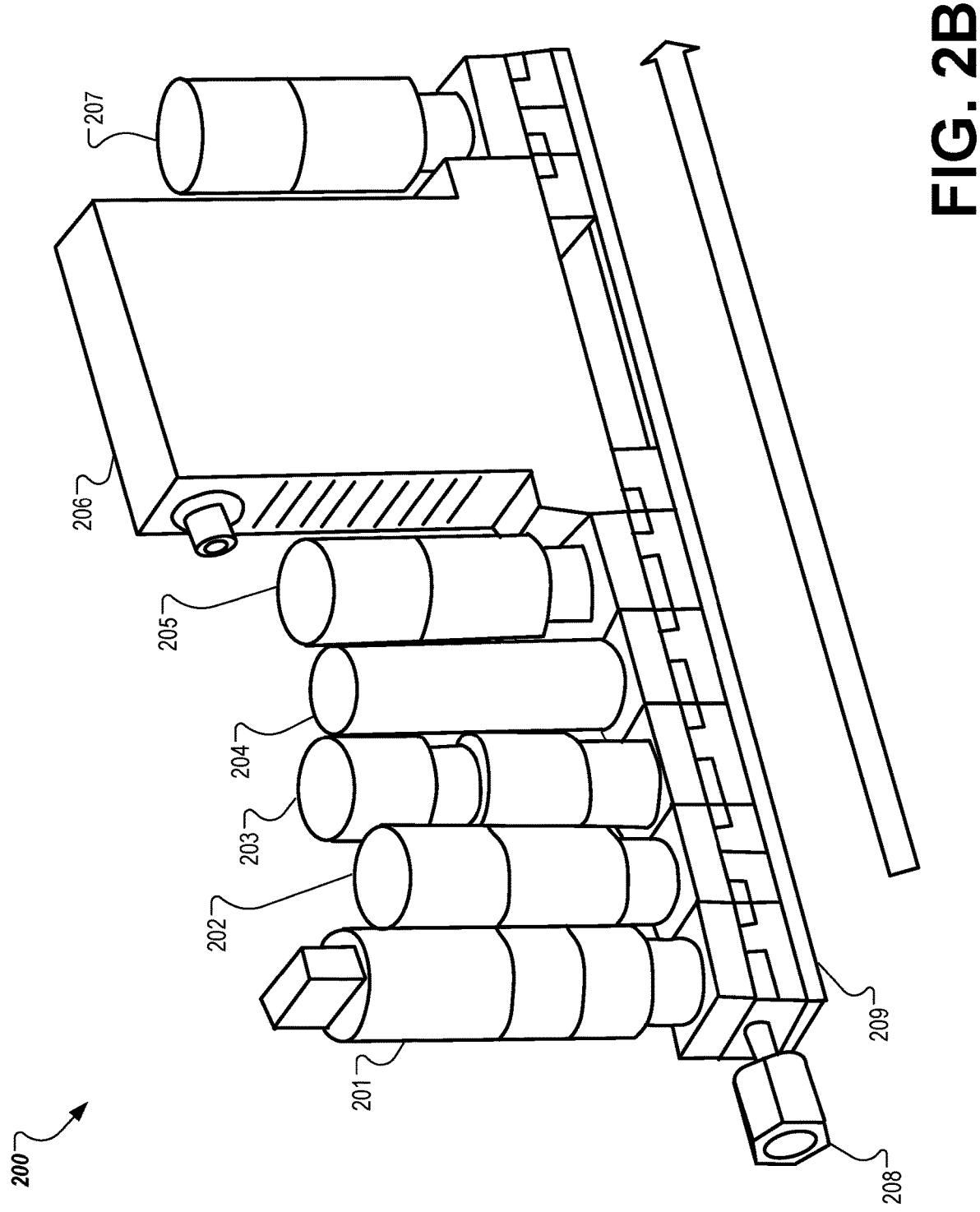
FIG. 2B is a perspective view of a gas stick assembly in accordance with embodiments of the present disclosure.

FIG. 2B illustrates a perspective view of a gas stick assembly 200 in accordance with embodiments of the present disclosure. A plurality of gas stick assemblies may receive gasses from a plurality of gas supplies. For example, a processing device may include a different gas stick assembly for each type of gas that is delivered into a process chamber. As shown, gas flows from left to right through the gas stick assembly.

In some embodiments, gas stick assembly 200 includes a base 209. Gas stick assembly 200 may receive a gas (e.g., from a gas source) via gas coupling 208. In some embodiments, gas stick assembly 200 includes hybrid valve 201, purge valve 202, regulator 203, filter 204, upstream valve 205, mass flow controller 206, and/or downstream valve 207. In some embodiments, each of hybrid valve 201, purge valve 202, regulator 203, filter 204, upstream valve 205, mass flow controller 206, and/or downstream valve 207 are coupled to a gas stick assembly base 209.

Figure 3A:
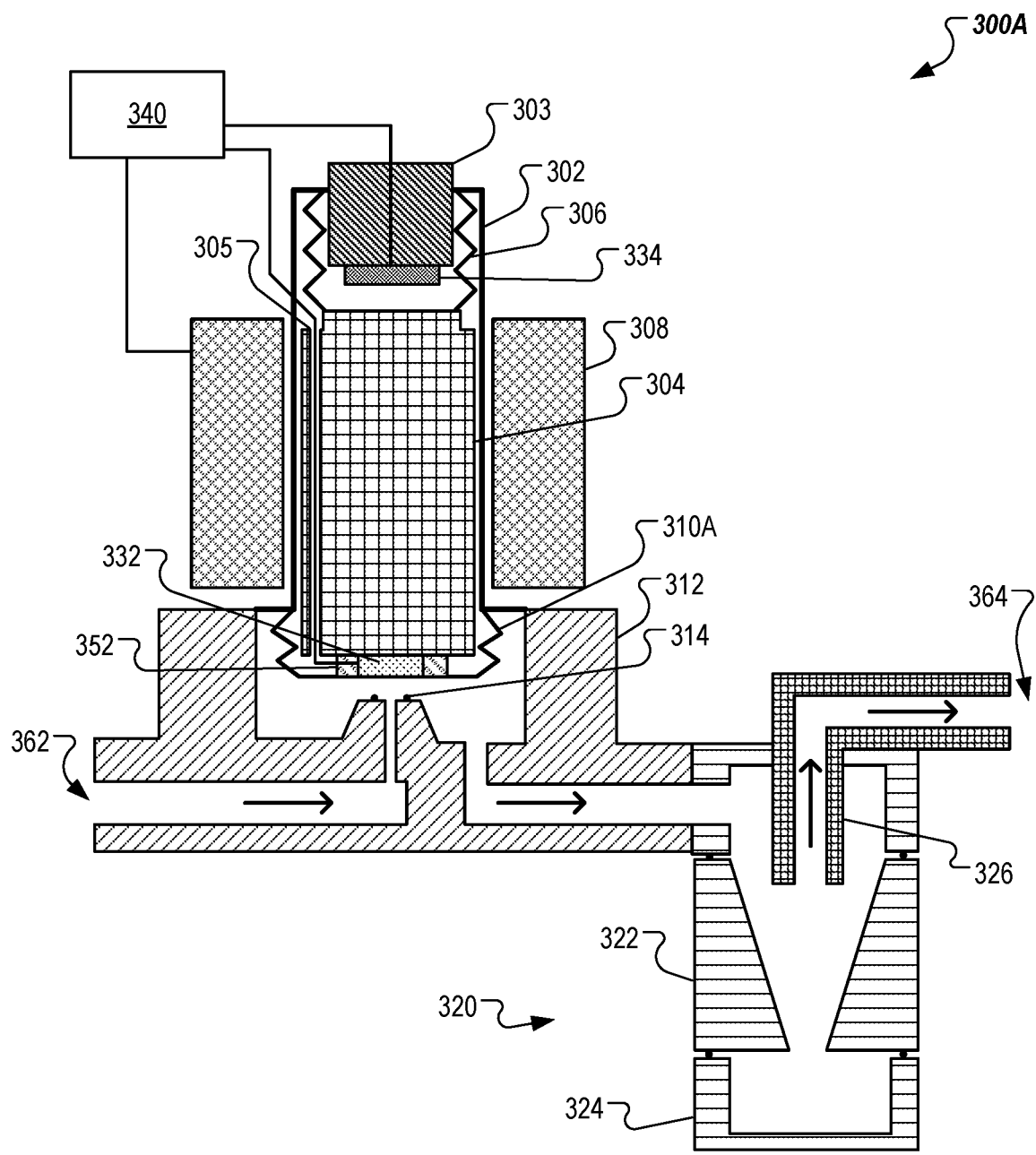
FIGS. 3A-3B are cutaway side views of a gas flow valve assembly in accordance with embodiments of the present disclosure.

FIG. 3A illustrates a cutaway side view of a gas flow valve assembly 300A in accordance with embodiments of the present disclosure. In some embodiments, gas flow valve assembly includes a housing 302 that houses various mechanical components and/or sensor components. In some embodiments, plunger 304 is disposed within housing 302.

Plunger 304 may be ferrous. In some embodiments, plunger 304 is a magnetized iron or steel rod. Housing 302 may include base 312 having one or more internal passages through which a gas can flow. In some embodiments, base 312 is constructed of stainless steel. In some embodiments, base 312 is welded to housing 302. In some embodiments, gas enters through gas inlet 362 and exits through gas outlet 364. When the plunger 304 is in one or more open positions (e.g., as illustrated), gas is allowed to flow past sealing surface 314. In some embodiments, sealing surface 314 is made up of an elastomer seal, such as an o-ring seal, etc. In some embodiments, an elastomer seal is bonded within a groove formed in base 312.

In some embodiments, an electromagnetic coil 308 can induce an electromagnetic force to move the plunger 304 against the force of a spring force. In some embodiments, the electromagnetic coil 308 can be energized with an electric current and/or a voltage. In some embodiments, spring 306 holds the plunger 304 in a normally closed position. In some embodiments, spring 306 holds the plunger 304 in a normally open position. Spring 306 may include one or more springs. In some embodiments, spring 306 is a coil spring that pushes on a top surface of the plunger 304. In some embodiments, spring 306 is made of a substantially corrosion-resistant metal such as stainless steel.

Figure 4B:
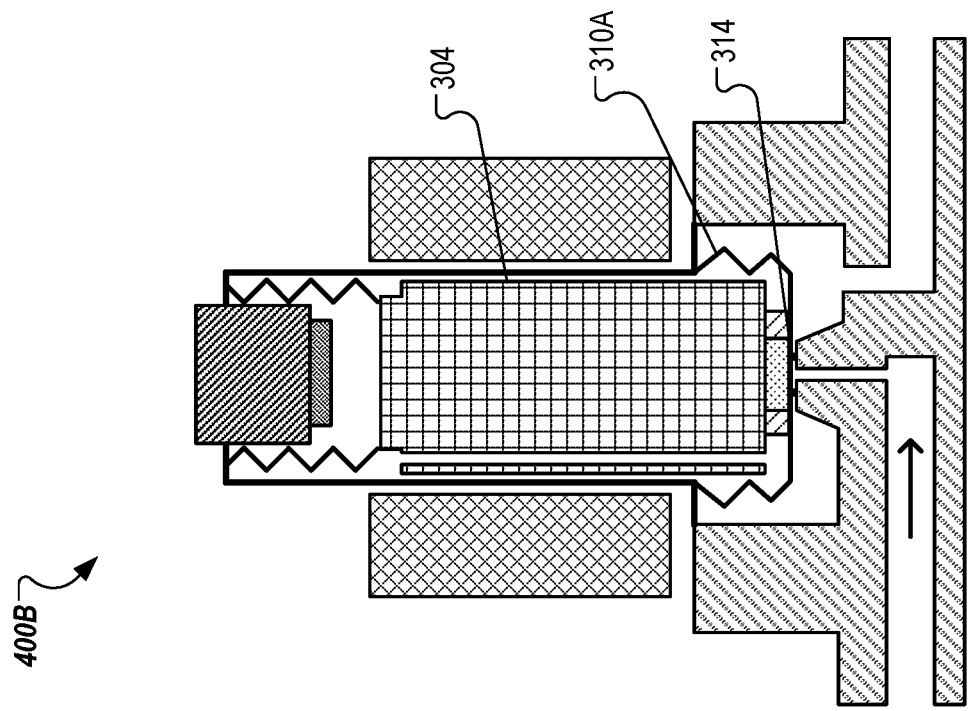
FIGS. 4A-4B illustrate cutaway side views of a gas flow valve in accordance with embodiments of the present disclosure.
Figure 4A:
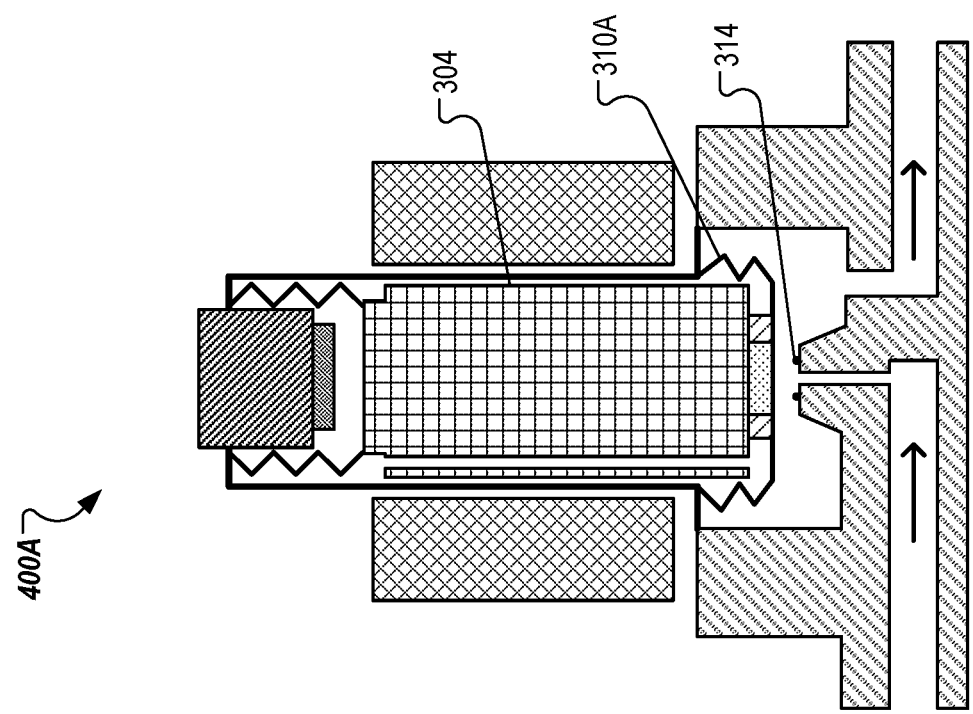

In some embodiments, a bellows 310A is configured to isolate a first interior portion of housing 302 from a second interior portion of housing 302. In some embodiments, bellows 310A separates a gas-flow portion of the valve assembly 300A from a sealed portion of the valve assembly 300A. In some embodiments, bellows 310A flexes as plunger 304 moves between a closed position and one or more open positions. For example, the flexing of bellows 310 is illustrated in FIGS. 4A and 4B. FIG. 4A illustrates a cutaway side view of a gas flow valve 400A in accordance with embodiments of the present disclosure. FIG. 4B illustrates a cutaway side view of a gas flow valve 400B in accordance with embodiments of the present disclosure. FIG. 4A shows plunger 304 in an open position while FIG. 4B shows plunger 304 in a closed position. In some embodiments, bellows 310A is in a compressed state when plunger 304 is in an open position as shown in FIG. 4A. In some embodiments, bellows 310A is in an extended state when plunger 304 is in a closed position as shown in FIG. 4B. The flow of gas through the valve may be stopped when the plunger 304 is in the closed position. When in the closed position, the plunger 304 and/or the force sensor 332 form a seal with sealing surface 314 to stop the flow of gas. In some embodiments, bellows 310A is a metal bellows. Bellows 310A may be substantially corrosion-resistant. In some embodiments, bellows 310A may be made from stainless steel. In some embodiments, bellows 310A is coupled to a portion of housing 302. In some embodiments, bellows 310A is welded to the housing 302.

Figure 3B:
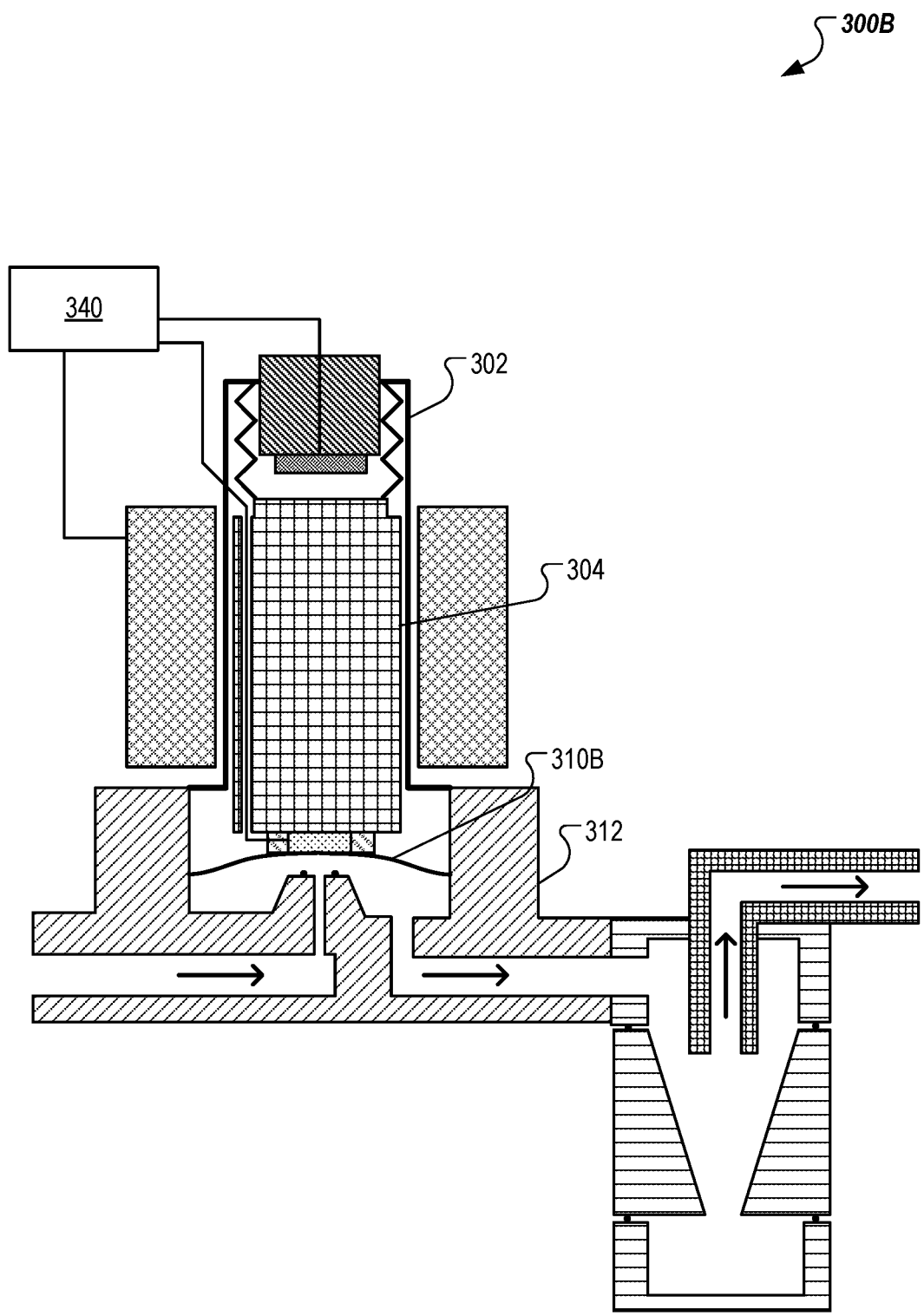

Referring to FIG. 3B, a cutaway side view of a gas flow valve assembly 300B in accordance with embodiments of the present disclosure is illustrated. In some embodiments, diaphragm 310B separates the gas-flow portion of the valve assembly 300B from the sealed portion of the valve assembly 300B. In some embodiments, diaphragm 310B flexes as plunger 304 moves between a closed position and one or more open positions. In some embodiments, diaphragm 310B is a metal diaphragm. Diaphragm 310B may be substantially corrosion-resistant. In some embodiments, diaphragm 310B may be made from stainless steel. In some embodiments, diaphragm 310B is coupled to base 312. In some embodiments, diaphragm 310B is coupled between base 312 and housing 302. In some embodiments, diaphragm 310B is welded to the housing 302 and/or to the base 312.

Referring again to FIG. 3A, in some embodiments, a position sensor 334 is coupled to the bottom of a cap 303 at the top of the housing 302. In some embodiments, position sensor 334 is coupled by one or more mechanical fasteners and/or an adhesive or bonding agent. In some embodiments, position sensor 334 is screwed into cap 303. In some embodiments, position sensor 334 measures the position of plunger 304. In some embodiments, position sensor 334 is a capacitive displacement sensor. In some embodiments, a capacitive displacement sensor is a non-contact measuring device that can measure the position and/or the change of position of a conductive target. In some embodiments, position data collected by the position sensor 334 is transmitted (e.g., via wires, via wireless communication, etc.) to the controller 340. In some embodiments, the controller 340 determines the position of the plunger 304 based on the position data. In some embodiments, the controller 340 causes the plunger to move based on the position data. In some examples, the controller 340 provides an output signal to the electromagnetic coil 308 to cause the plunger 304 to move. The controller may receive position data (e.g., from the position sensor 334) indicating that the plunger 304 is a non-target position. The controller may determine a new output signal (e.g., based on the received position data) to the electromagnetic coil to cause the plunger 304 to move to the target position. In some embodiments, the controller 340 can determine the distance between the sealing surface 314 and the bottom surface of the plunger 304 (e.g., the bottom surface of the force sensor 332 coupled to the bottom surface of the plunger 304). For example, the controller 340 can infer the gap between the bottom surface of the plunger 304 and the sealing surface 314 using the position data and the known height (e.g., length, etc.) of the plunger 304. The controller 340 can cause the plunger 304 to move (e.g., by providing an output signal to the electromagnetic coil 308) to increase or decrease the size of the gap.

In some embodiments, a force sensor 332 is coupled to the bottom of the plunger 304. In some embodiments, the force sensor 332 is coupled to the second end of the plunger opposite the first end, where the spring 306 applies force to the first end of the plunger 304. In some embodiments, force sensor 332 is bonded to the bottom of plunger 304 by an epoxy layer 352. Epoxy layer 352 may be an adhesive layer to bond force sensor 332 to plunger 304. In some embodiments, force sensor 332 is coupled to plunger 304 by one or more mechanical fasteners. In some embodiments, force sensor 332 is a piezoelectric module. In some embodiments, a piezoelectric module includes one or more crystals configured to convert mechanical energy into electrical energy. In some embodiments, a piezoelectric module is configured to sense applied force.

In some embodiments, force sensor 332 is configured to measure force applied by the plunger 304. In some embodiments, force sensor 332 senses the amount of force applied by the plunger 304 onto the sealing surface 314 when the plunger 304 is in the closed position, such as illustrated in FIG. 4B. In some embodiments, force sensor 332 contacts the sealing surface 314 when plunger 304 is in the closed position to block the flow of gas through the valve. In some embodiments, an electrical signal indicative of the magnitude of the force applied on the sealing surface 314 is sent to the controller 340. In some embodiments, one or more wires routed through the plunger 304 via a through-hole 305 electrically connect the force sensor 332 with the controller 340.

In some embodiments, the controller 340 can determine whether a leak is present at the sealing surface 314 when the plunger 304 is in the closed position. Leaking gas (e.g., through the sealing surface 314 when the plunger 304 is in the closed position) may induce a vibration that is sensed by the force sensor 332. The vibration may be evidenced by small fluctuations in the applied force sensed by the force sensor 332. In some embodiments, when the controller 340 determines that gas is leaking, the controller 340 may cause the plunger 304 to increase the force applied to the sealing surface. The controller 340 may cause a signal to be sent to the electromagnetic coil 308 to cause the plunger to apply a greater force on the sealing surface 314 either by increasing the current and/or voltage applied to the electromagnetic coil 308 or by decreasing the current and/or voltage applied to the electromagnetic coil 308 so that the plunger (e.g., via the force sensor 332) applies an increased force to the sealing surface 314.

In some embodiments, the controller 340 can determine the health of the sealing surface 314 using force data from the force sensor 332 and position data from the position sensor 334. In some embodiments, the controller 340 calculates a stress-strain curve of the sealing surface 314. In some examples, the controller 340 can sense displacement (e.g., strain) of the sealing surface 314 as the applied force (e.g., stress) is increased on the sealing surface 314 as the plunger 304 is moved to the closed position. The controller 340 may correspond the strain indicated by position data (e.g., from the position sensor 334) with the stress indicated by force data (e.g., from force sensor 332) to calculate a stress-strain curve. In some embodiments, the controller 340 compares the calculated stress-strain curve with a known healthy stress-strain curve for the sealing surface 314. The known healthy stress-strain curve may correspond to the stress-strain curve of the sealing surface 314 in good condition such as when new or unused. The known healthy stress-strain curve may be associated with a threshold criterion for comparing the calculated stress-strain curve. As the sealing surface 314 deteriorates over time and/or with use, the stress-strain curve may drift and/or change. In some embodiments, the controller 340 may determine the health of the sealing surface 314 based on the drift and/or change in the stress-strain curve. In some embodiments, the controller may determine that the sealing surface 314 is in an unhealthy state responsive to determining that the calculated stress-strain curve has exceeded a threshold condition. The controller 340 may output a notification (e.g., to a technician, etc.) that the sealing surface 314 should be serviced or replaced when the sealing surface is in an unhealthy condition.

In some embodiments, the controller 340 can determine the health of the spring 306 using force data form the force sensor 332. In some embodiments, spring 306 provides the force to move the plunger 304 to the closed position. Spring force (e.g., from spring 306) may hold the plunger 304 closed to stop the flow of gas. The force sensor 332 may sense the spring force applied by the spring 306 to hold the plunger 304 in the closed position. As the spring 306 wears with use, the spring force applied by the spring 306 may decrease over time. The force data may indicate the decrease in spring force. In some embodiments, the controller 340 can determine the condition of the spring 306 based on the force data indicative of the spring force. The controller 340 may determine that the spring 306 is in an unhealthy condition when the force indicated by the force data (e.g., from the force sensor 332) falls below a threshold value. In some embodiments, the controller 340 may output a notification that the spring 306 should be serviced or replaced when the spring is in an unhealthy condition.

In some embodiments, the controller 340 can initiate a self-cleaning procedure to dislodge particles from the sealing surface 314. In some embodiments, the controller can send a command (e.g., an electronic signal) to induce vibration in the force sensor 332 to dislodge particles from the sealing surface 314. For example, where the force sensor 332 is a piezoelectric module, the controller can send an electrical signal to the piezoelectric module to excite the piezoelectric crystals and induce vibration. The vibration may cause particles which have collected on the sealing surface 314 to become dislodged. The flow of gas through the valve may carry the dislodged particles away from the sealing surface 314. In some embodiments, to cause the particles to become dislodged, the plunger 304 is opened so that the force sensor 332 contacts the sealing surface 314 but does not create a seal to stop the flow of gas. Vibration induced in the force sensor 332 may dislodge particles and flowing gas may carry the dislodged particles away.

In some embodiments, particle trap 320 is coupled to base 312. In some embodiments, particle-laden gas flows into the particle trap 320 through an inlet and into a separator module 322. Particles may be separated from the flowing gas and collected in a detachable receptacle 324. Substantially particle-free gas may flow up through collection tube 326 and out through gas outlet 364. In some embodiments, a cyclone or vortex is induced in the gas flow within separator module 322. In some embodiments, the cyclonic flow is induced in the separator module 322 by introducing the gas flow tangentially into the module. The cyclonic flow in the gas flow may cause particles to be forced to the walls of the separator module 322 due to centrifugal force. In some embodiments, the walls of the separator module 322 are rough so that particles adhere to the walls. In some embodiments, particles move down the walls of the separator module 322 and fall into the detachable receptacle 324. The detachable receptacle 324 may be configured to be periodically removed for cleaning. In some embodiments, the detachable receptacle 324 can be detached from the separator module 322 so that the detachable receptacle 324 can be emptied of collected particles. In some embodiments, detachable receptacle 324 is coupled to the separator module 322 by one or more mechanical fasteners. In some embodiments, a seal, such as an o-ring seal, seals the interface between the separator module 322 and the detachable receptacle 324. In some embodiments, separator module 322 is coupled to an upper portion of particle trap 320 by one or more mechanical fasteners. In some embodiments, a seal (e.g., an o-ring seal, an elastomer seal, etc.) seals the interface between the separator module 322 and the upper portion of the particle trap 320. In some embodiments, the upper portion of the particle trap 320 couples the particle trap 320 to the base 312. In some embodiments, the separator module 322, the detachable receptacle 324, the upper portion of the particle trap 320, and/or the collection tube 326 are made of a substantially corrosion-free metal such as stainless steel.

Figure 5A:
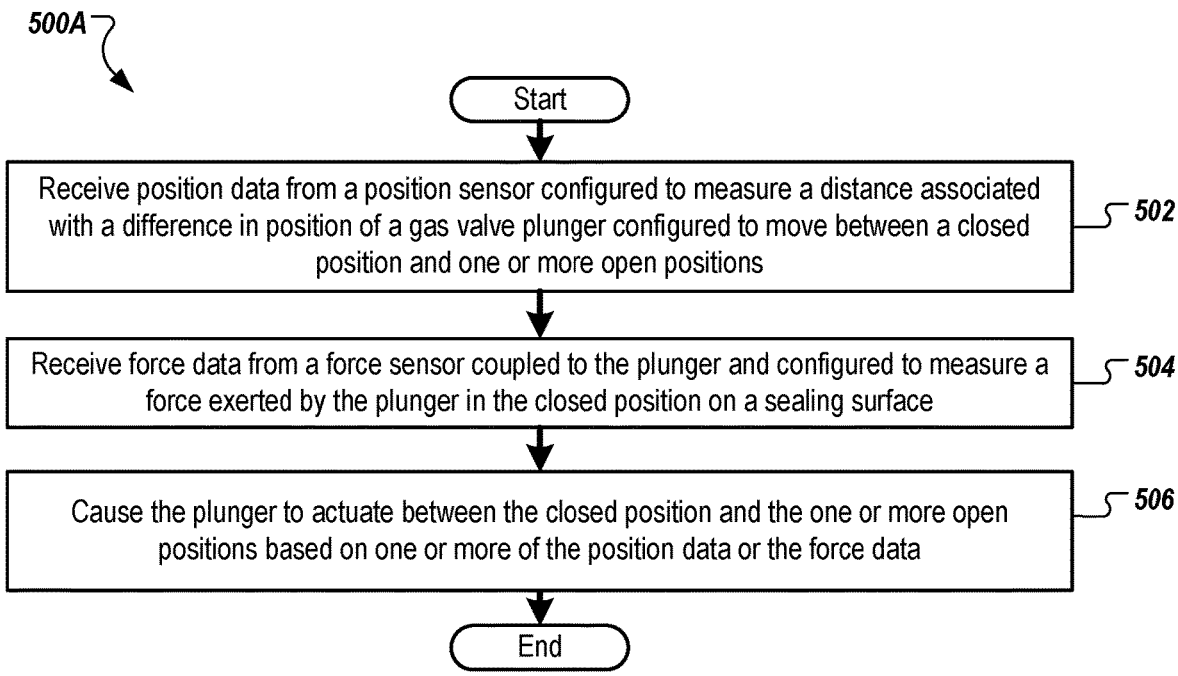
FIGS. 5A-5B are flow diagrams of methods of controlling a gas flow valve in accordance with embodiments of the present disclosure.
Figure 5B:
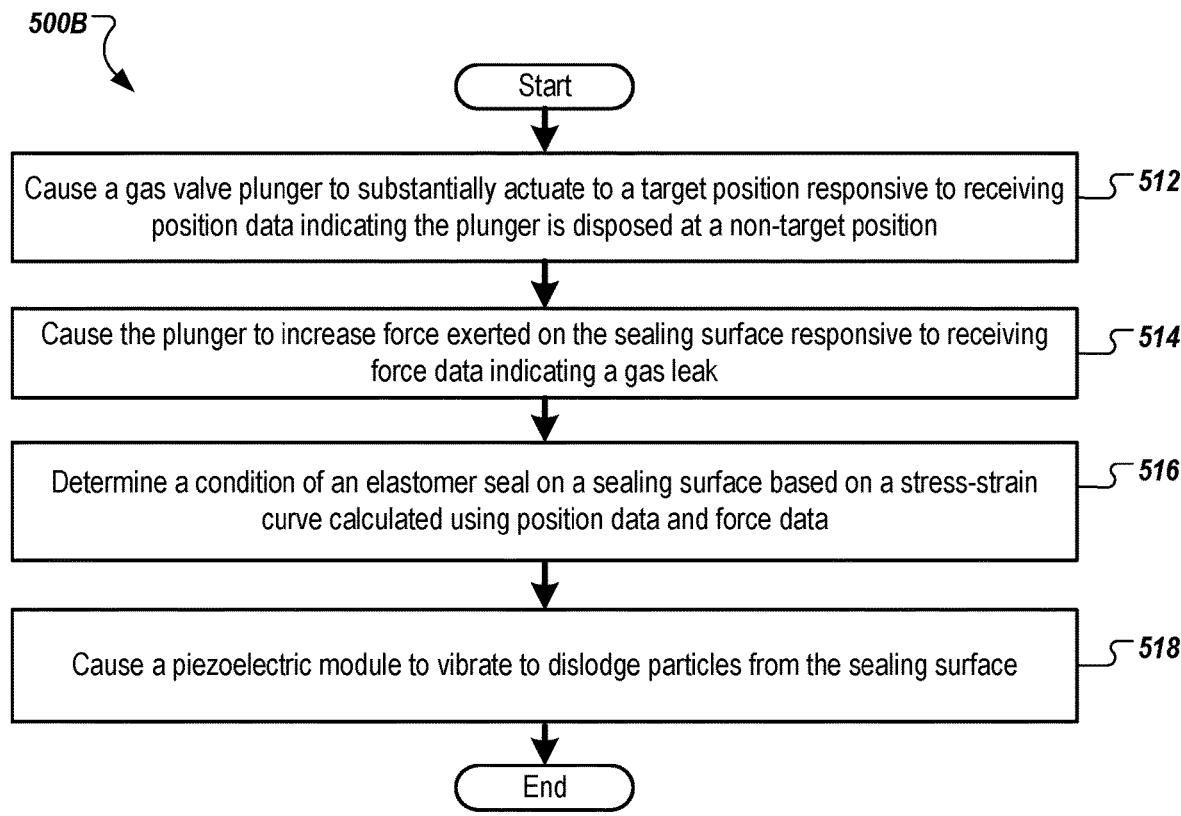

FIGS. 5A-5B are flow diagrams of methods of controlling a gas flow valve in accordance with embodiments of the present disclosure. FIG. 5A is a flow diagram of a method 500A for controlling a gas flow valve such as gas flow valve assemblies 300A, 300B or flow valves 400A or 400B in accordance with embodiments of the present disclosure. In some embodiments, method 500A is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500A is performed, at least in part, by a controller a gas flow valve assembly (e.g., controller 340).

For simplicity of explanation, method 500A is depicted and described as a series of operations. However, operations in accordance with this disclosure can occur in various orders and/or concurrently and with other operations not presented and described herein. Furthermore, in some embodiments, not all illustrated operations are performed to implement method 500A in accordance with the disclosed subject matter. In addition, those skilled in the art will understand and appreciate that method 500A could alternatively be represented as a series of interrelated states via a state diagram or events.

In some embodiments, at block 502, processing logic receives position data from a position sensor. The position sensor may be configured to measure a distance associated with a difference in position of a gas flow valve plunger configured to move between a closed position and one or more open positions. In some embodiments, the position sensor is a capacitive displacement sensor. In some embodiments, position data is indicative of the position of the plunger relative to the sensor.

In some embodiments, at block 504, processing logic receives force data from a force sensor. In some embodiments, the force sensor is coupled to the plunger. The force sensor may measure a force exerted by the plunger in the closed position on a sealing surface. In some embodiments, the force sensor is a piezoelectric module that outputs an electrical signal responsive to sensing an applied force.

In some embodiments, at block 506, processing logic causes the plunger to actuate between the closed position and the one or more open positions based on one or more of the position data or the force data. In some embodiments, the processing logic causes the plunger to open to a more open position or a less open position based on the position data. In some embodiments, the processing logic causes the plunger to close based on the position data indicating the plunger is in an open position. In some embodiments, the processing logic causes the plunger to exert a greater force on the sealing surface responsive to the force data indicating a gas leak or an insufficient sealing force.

FIG. 5B is a flow diagram of a method 500B for controlling a gas flow valve such as gas flow valve assemblies 300A, 300B or flow valves 400A or 400B in accordance with embodiments of the present disclosure. In some embodiments, method 500B is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500B is performed, at least in part, by a controller a gas flow valve assembly (e.g., controller 340).

For simplicity of explanation, method 500B is depicted and described as a series of operations. However, operations in accordance with this disclosure can occur in various orders and/or concurrently and with other operations not presented and described herein. Furthermore, in some embodiments, not all illustrated operations are performed to implement method 500B in accordance with the disclosed subject matter. In addition, those skilled in the art will understand and appreciate that method 500B could alternatively be represented as a series of interrelated states via a state diagram or events.

In some embodiments, at block 512, processing logic causes a gas valve plunger to substantially actuate to a target position responsive to receiving position data indicating the plunger is disposed at a non-target position. In some embodiments, processing logic determines (e.g., based on position data received at block 502) that the plunger position does not match the target plunger position. The processing logic may cause the plunger to be actuated so that the plunger position substantially matches the target plunger position.

In some embodiments, at block 514, processing logic causes the plunger to increase force exerted on the sealing surface responsive to receiving force data indicating a gas leak. In some embodiments, processing logic determines (e.g., based on force data received at block 504) that gas is leaking past the sealing surface. The processing logic may determine that a leak exists based on force data that reflects fluctuations in applied force of the plunger on the sealing surface. Processing logic may cause the plunger to exert more force on the sealing surface to stop the leak.

In some embodiments, at block 516, processing logic determines a condition of an elastomer seal on a sealing surface based on a stress-strain curve calculated using position data and force data. In some embodiments, processing logic calculates the stress-strain curve using position data and/or force data receiving from the position sensor and/or the force sensor when the plunger is actuated to the closed position. In some embodiments, processing logic compares the calculated stress-strain curve with a baseline stress-strain curve (e.g., a known healthy stress-strain curve, a threshold criterion, etc.) to determine the condition of the elastomer seal. In some embodiments, processing logic outputs a notification (e.g., to a technician), indicative of the condition of the elastomer seal. The notification may be output responsive to the calculated stress-strain curve failed to meet a threshold criterion.

In some embodiments, at block 518, processing logic causes a piezoelectric module to vibrate to dislodge particles from the sealing surface. In some embodiments, the piezoelectric module is the force sensor. In some embodiments, the vibration of the piezoelectric module causes particles to be dislodged from the sealing surface. The dislodged particles may be carried away by the flow of gas. The piezoelectric module may be caused to vibrate when the force data and/or the position data indicate to the processing logic that excess particles are on the sealing surface. Dislodged particles may be collected in a particle trap.

Figure 6:
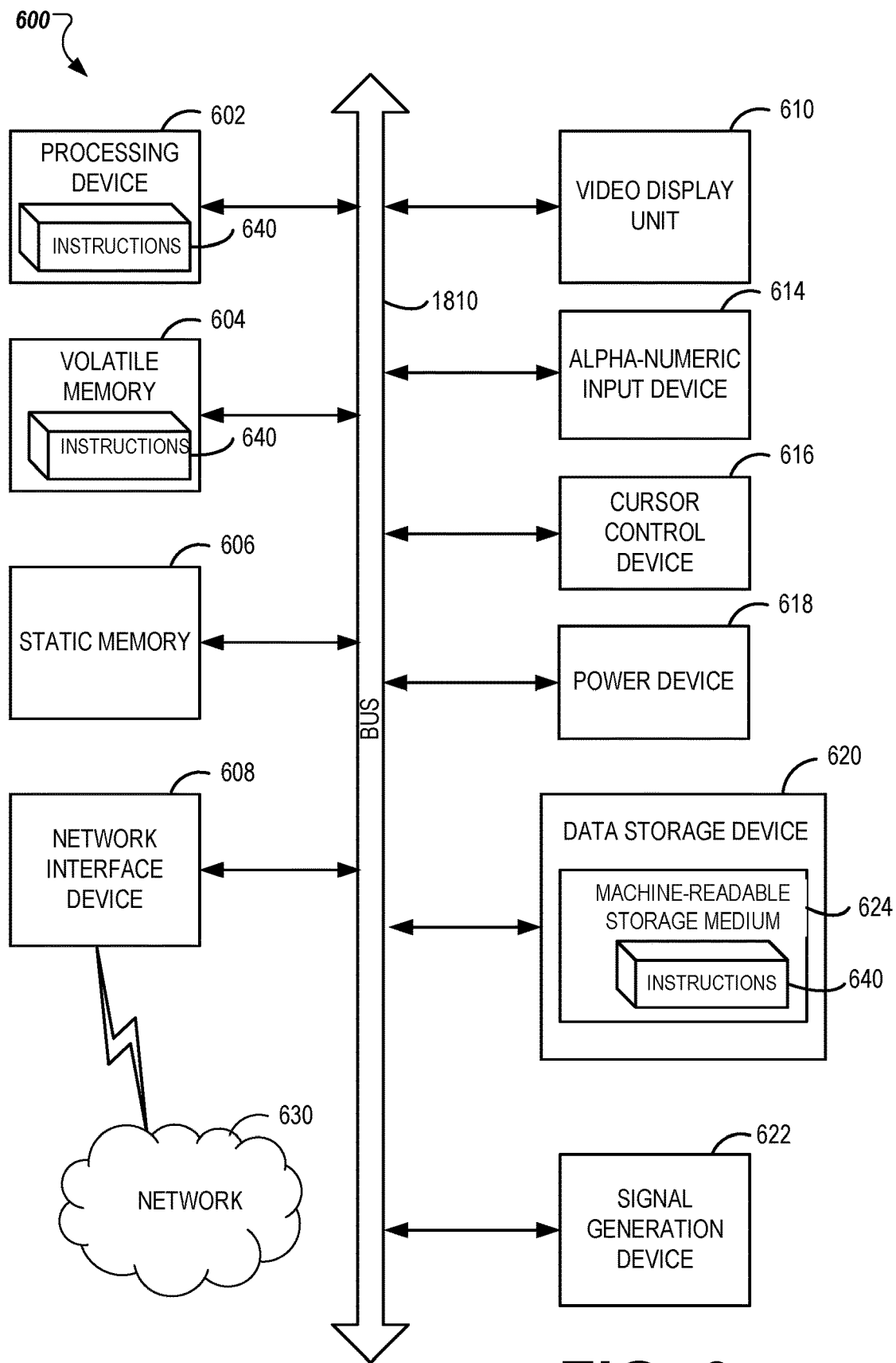
FIG. 6 is a block diagram illustrating a computer system for use in accordance with the embodiments of the present disclosure.

FIG. 6 illustrates a diagrammatic representation of a machine in the exemplary form of a computer system 600 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a PDA, a cellular telephone, a web appliance, a server, a network router, switch or bridge, or any machine capable of executing a set of instructions (sequentially or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 600 may be utilized by or illustrative of any of the electronic components described herein.

The exemplary computer system 600 includes a processing device (processor) 602, a main memory 604 (e.g., ROM, flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 620, which communicate with each other via a bus 610.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 640 for performing the operations discussed herein.

The computer system 600 may further include a network interface device 608. The computer system 600 also may include a video display unit 612 (e.g., a liquid crystal display (LCD), a cathode ray tube (CRT), or a touch screen), an alphanumeric input device 614 (e.g., a keyboard), a cursor control device 616 (e.g., a mouse), and a signal generation device 622 (e.g., a speaker).

Power device 618 may monitor a power level of a battery used to power the computer system 600 or one or more of its components. The power device 618 may provide one or more interfaces to provide an indication of a power level, a time window remaining prior to shutdown of computer system 600 or one or more of its components, a power consumption rate, an indicator of whether computer system is utilizing an external power source or battery power, and other power related information. In some implementations, indications related to the power device 618 may be accessible remotely (e.g., accessible to a remote back-up management module via a network connection). In some implementations, a battery utilized by the power device 618 may be an uninterruptable power supply (UPS) local to or remote from computer system 600. In such implementations, the power device 618 may provide information about a power level of the UPS.

The data storage device 620 may include a computer-readable storage medium 624 (e.g., a non-transitory computer-readable storage medium) on which is stored one or more sets of instructions 640 (e.g., software) embodying any one or more of the methodologies or functions described herein. These instructions 640 may also reside, completely or at least partially, within the main memory 604 and/or within the processor 602 during execution thereof by the computer system 600, the main memory 604, and the processor 602 also constituting computer-readable storage media. The instructions 640 may further be transmitted or received over a network 630 via the network interface device 608. While the computer-readable storage medium 624 is shown in an exemplary implementation to be a single medium, it is to be understood that the computer-readable storage medium 624 may include a single medium or multiple media (e.g., a centralized or distributed database, and/or associated caches and servers) that store the one or more sets of instructions 640.

In the foregoing description, numerous details are set forth. It will be apparent, however, to one of ordinary skill in the art having the benefit of this disclosure, that the present disclosure may be practiced without these specific details. While specific embodiments have been described herein, it should be understood that they have been presented by way of example only, and not limitation. The breadth and scope of the present application should not be limited by any of the embodiments described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

References were made to the accompanying drawings, which form a part of the description and in which are shown, by way of illustration, specific embodiments. Although these disclosed embodiments are described in sufficient detail to enable one skilled in the art to practice the embodiments, it is to be understood that these examples are not limiting, such that other embodiments may be used and changes may be made to the disclosed embodiments without departing from their spirit and scope. For example, the blocks of the methods shown and described herein are not necessarily performed in the order indicated in some other embodiments. Additionally, in some other embodiments, the disclosed methods may include more or fewer blocks than are described. As another example, some blocks described herein as separate blocks may be combined in some other embodiments. Conversely, what may be described herein as a single block may be implemented in multiple blocks in some other embodiments. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion. When the term "about" or "approximately" is used herein, this is intended to mean that the nominal value presented is precise within +10%.

In addition, the articles "a" and "an" as used herein and in the appended claims should generally be construed to mean "one or more" unless specified otherwise or clear from context to be directed to a singular form. Reference throughout this specification to "an embodiment," "one embodiment," "some embodiments," or "certain embodiments" indicates that a particular feature, structure, or characteristic described in connection with the embodiment is included in at least one embodiment. Thus, the appearances of the phrase "an embodiment," "one embodiment," "some embodiments," or "certain embodiments" in various locations throughout this specification are not necessarily all referring to the same embodiment.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "processing," "reprocessing," "adding," "subtracting," "multiplying," "dividing," "optimizing," "calibrating," "detecting," "performing," "analyzing," "determining," "enabling," "identifying," "modifying," "transforming," "applying," "causing," "storing," "comparing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A gas flow valve, comprising:
    a housing configured to receive a flow of gas;
    a plunger configured to move between a closed position and one or more open positions within the housing;
    a position sensor configured to measure a distance associated with a difference in position of the plunger between the closed position and the one or more open positions; and
    a force sensor coupled to the plunger, wherein the force sensor is configured to measure a force exerted by the plunger in the closed position on a sealing surface and further configured to induce vibration on the sealing surface responsive to being energized to dislodge particles from the sealing surface.

2. The gas flow valve of claim 1, further comprising:
    a particle trap forming a chamber configured to separate particles from the flow of gas, wherein at least a portion of the particle trap is configured to be removed for cleaning.

3. The gas flow valve of claim 2, wherein the particle trap is configured to induce a cyclone in the flow of gas within the chamber to separate the particles from the flow of gas due to centrifugal force.

4. The gas flow valve of claim 1, wherein the force sensor is coupled to a first end of the plunger and is configured to contact an elastomer seal of the sealing surface when the plunger is in the closed position, and wherein the distance comprises a distance between the position sensor and a second end of the plunger opposite the first end.

5. The gas flow valve of claim 1, further comprising:
a spring within the housing configured to hold the plunger in the closed position or in an open position of the one or more open positions; and
an electromagnetic coil configured to actuate the plunger between the closed position and the one or more open positions responsive to being energized with an electric current.

6. The gas flow valve of claim 1, further comprising:
one or more of a metal bellows or a metal diaphragm configured to isolate a first portion of the housing from a second portion of the housing, wherein the plunger is disposed in the first portion of the housing and gas is to flow through the second portion of the housing.

7. The gas flow valve of claim 1, wherein the force sensor is a piezoelectric module configured to contact the sealing surface when the plunger is in the closed position and measure force applied by the plunger on the sealing surface.

8. The gas flow valve of claim 1, wherein the position sensor is a capacitive displacement sensor disposed within the housing.

9. A gas flow assembly, comprising:
a valve comprising:
a housing configured to receive a flow of gas;
a plunger configured to move between a closed position and one or more open positions within the housing;
a position sensor configured to measure a distance associated with a difference in position of the plunger between the closed position and the one or more open positions; and
a force sensor coupled to the plunger, wherein the force sensor is configured to measure a force exerted by the plunger in the closed position on a sealing surface and further configured to induce vibration on the sealing surface responsive to being energized to dislodge particles from the sealing surface;
a particle trap forming a chamber configured to separate particles from the flow of gas; and
a processing device configured to cause the valve to actuate to control the flow of gas based on sensor data from one or more of the position sensor or the force sensor.

10. The gas flow assembly of claim 9, wherein the particle trap is configured to induce a cyclone in the flow of gas within the chamber to separate the particles from the flow of gas due to centrifugal force.

11. The gas flow assembly of claim 9, wherein the force sensor is coupled to a first end of the plunger and is configured to contact an elastomer seal of the sealing surface when the plunger is in the closed position, and wherein the distance comprises a distance between the position sensor and a second end of the plunger opposite the first end.

12. The gas flow assembly of claim 9, wherein the valve further comprises:
one or more of a metal bellows or a metal diaphragm configured to isolate a first portion of the housing from a second portion of the housing, wherein the plunger is disposed in the first portion of the housing and gas is to flow through the second portion of the housing.

13. The gas flow assembly of claim 9, wherein the force sensor is a piezoelectric module configured to contact the sealing surface when the plunger is in the closed position and measure force applied by the plunger on the sealing surface.

14. The gas flow assembly of claim 9, wherein the position sensor is a capacitive displacement sensor disposed within the housing.

15. The gas flow assembly of claim 9, wherein the processing device is further configured to cause the plunger to substantially actuate to a target position responsive to receiving position data from the position sensor indicating the plunger is disposed at a non-target position.

16. The gas flow assembly of claim 9, wherein the processing device is further configured to cause the plunger to increase force exerted on the sealing surface responsive to receiving force data from the force sensor indicating a gas leak.

17. The gas flow assembly of claim 9, wherein the processing device is further configured to determine a condition of an elastomer seal on the sealing surface based on a stress-strain curve calculated using sensor data received from the position sensor and the force sensor.

18. The gas flow assembly of claim 9, wherein the processing device is further configured to prepare a notification of one or more of a gas leak or a condition of an elastomer seal on the sealing surface has deteriorated beyond a threshold condition based on sensor data received from one or more of the position sensor or the force sensor.

19. A method, comprising:
receiving position data from a position sensor configured to measure a distance associated with a difference in position of a gas valve plunger configured to move between a closed position and one or more open positions;
receiving force data from a force sensor coupled to the plunger and configured to measure a force exerted by the plunger in the closed position on a sealing surface;
causing the plunger to actuate between the closed position and the one or more open positions based on one or more of the position data or the force data; and
causing the force sensor to vibrate to dislodge particles from the sealing surface.

20. The method of claim 19, further comprising
causing the plunger to substantially actuate to a target position responsive to receiving position data indicating the plunger is disposed at a non-target position;
causing the plunger to increase force exerted on the sealing surface responsive to receiving force data indicating a gas leak; and
determining a condition of an elastomer seal on the sealing surface based on a stress-strain curve calculated using the position data and the force data.

* * * * *